United States Patent [19]

Intrator

[11] 4,200,902
[45] Apr. 29, 1980

[54] PHOTOGRAPHY LIGHT

[76] Inventor: Charles Intrator, 225 Fifth Ave., Venice, Calif. 90291

[21] Appl. No.: 961,211

[22] Filed: Nov. 16, 1978

[51] Int. Cl.² ............................................. G03B 15/02
[52] U.S. Cl. ........................................ 362/17; 362/18; 362/263; 362/298; 362/301; 362/343; 362/346; 362/349
[58] Field of Search .................. 362/17, 18, 263, 298, 362/301, 343, 346, 349

[56] References Cited
U.S. PATENT DOCUMENTS
4,052,607  10/1977  Larson ..................................... 362/18

Primary Examiner—Stephen J. Lechert, Jr.
Attorney, Agent, or Firm—Abner Sheffer

[57] ABSTRACT

A camera-mounted illuminating device particularly useful for motion picture photography to provide relatively constant lighting of close-up scenes in motion pictures despite movement of the camera toward and away from the scene.

19 Claims, 22 Drawing Figures

PHOTOGRAPHY LIGHT

This invention relates to an improved "O.B." light. An O.B. light is a source of diffuse light mounted on or extending from a motion picture camera, and in such close proximity to the camera lens that the shadows it projects are substantially hidden from the lens. It is used largely for close-up photography say, for photographing a person's face. The distance from camera lens (and O.B. light) to the face being photographed is usually in the range of about 1 to 6 feet (e.g. 30 to 180 cm) and the O.B. light serves to fill in or wash out undesirable shadows of facial features. In motion picture photography there are often occasions when the camera (with the O.B. light) is moved toward and away from the scene being photographed. To maintain the light level as constant as possible on the scene during such movement (in which the distance between the scene and the O.B. light is changed), while maintaining a substantially constant color temperature of the illumination (which is particularly important when using color film), it is necessary to provide means for controllably varying the intensity of the illumination coming from the O.B. light without changing its color temperature. Various arrangements of louvres and reflectors have been proposed for this purpose; see West German published application No. 1,597,930 and U.S. Pat. No. 4,015,113.

The device described in this application provides a light and highly efficient and economical diffused light source whose output can be readily and easily controlled over a wide range while maintaining its color temperature at, say, 3200° K., which can be constructed of simple parts without the need for close tolerances and which will operate reliably for long periods of time without the need to shut off the high intensity light to permit the device to cool off.

Certain aspects of the invention are illustrated in the accompanying drawings (which are drawn approximately to scale unless otherwise indicated).

Figure 8:
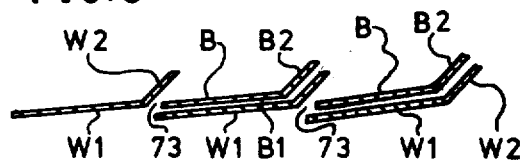
Figure 9:
Figure 10:
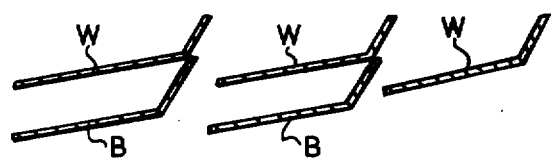

FIGS. 8–10 are cross-sectional view, looking upwards, of the two interfitting sets of light control elements towards which the light from the lamp is directed by the reflector. FIG. 8 shows these elements in position to furnish maximum illumination; FIG. 9 shows them in a position adapted to reduce the illumination by about 50% and FIG. 10 shows them in a position to give minimum illumination.

Figure 11:
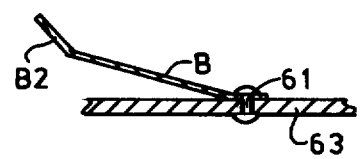

FIG. 11 is a plan view, partly in cross-section of a portion of a light control element and its mounting.

Figure 12:
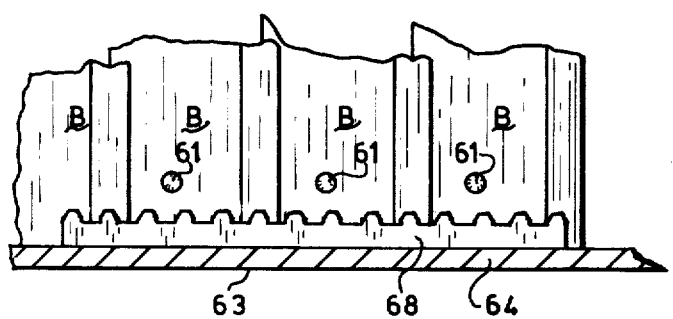

FIG. 12 is a view, in elevation, of a portion of the assembly of movable light control elements, showing the side which does not receive the light and showing a rack adapted to engage a pinion.

Figure 13:
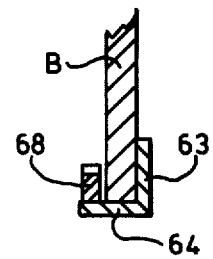

FIG. 13 is a side view partly in cross-section, of the assembly shown in FIG. 12.

Figure 14:
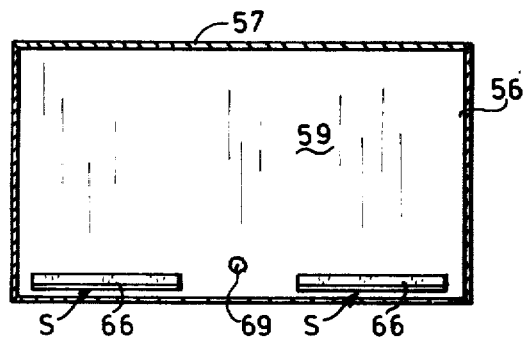

FIG. 14 is a view, in elevation, of a back panel of the device, showing a pinion and guides.

Figure 15:
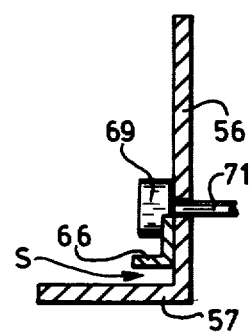

FIG. 15 is a view, in elevation and partly in cross-section, of the back panel shown in FIG. 14.

Figure 16:
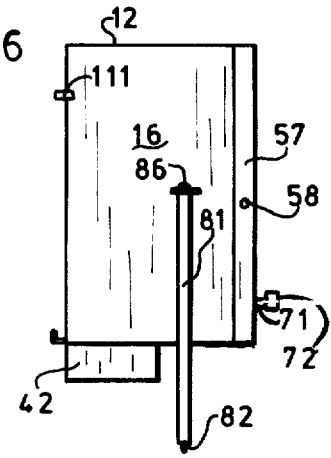

FIG. 16 is a side view of the device.

Figure 17:
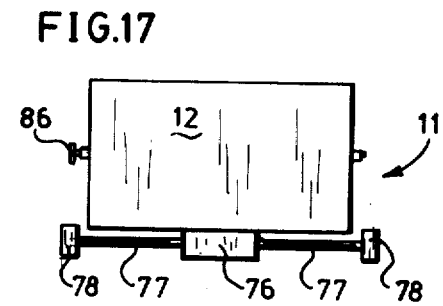

FIG. 17 is a top view of a modified form of the device.

Figure 18:
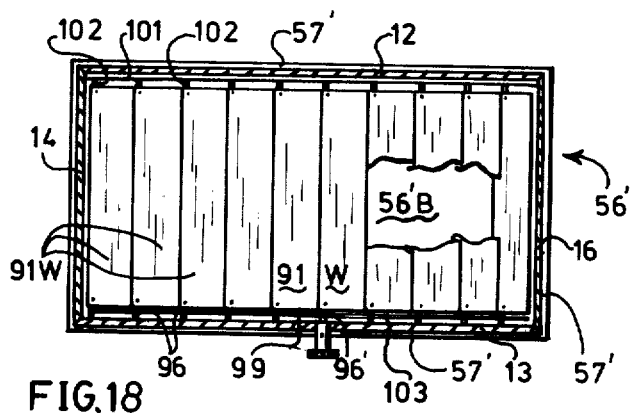
Figure 19:
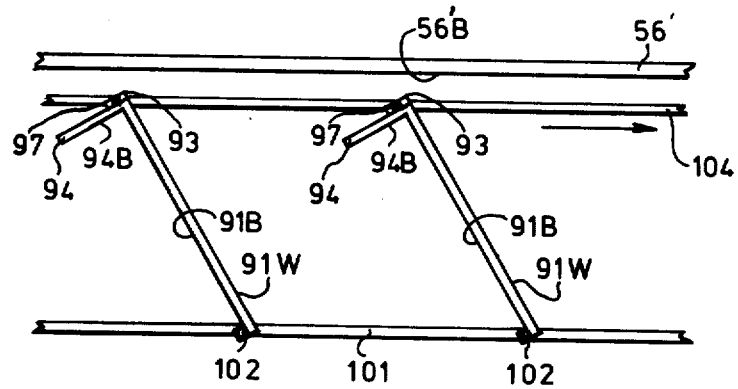
Figure 20:
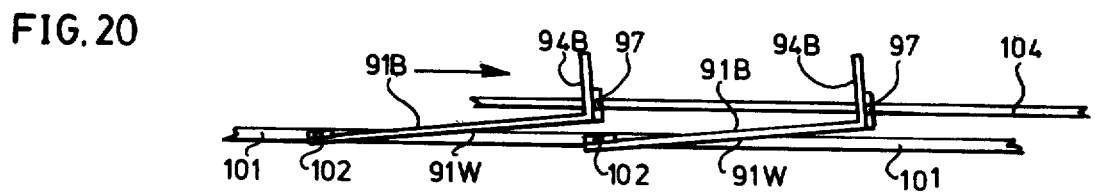

FIGS. 18, 19 and 20 show a modification of the light-control mechanism. FIG. 18 is a view in elevation, with the walls of the box in cross-section; FIGS. 19 and 20 are plan views showing the light controlling slats in positions giving minimum and maximum light output, respectively.

Figure 21:
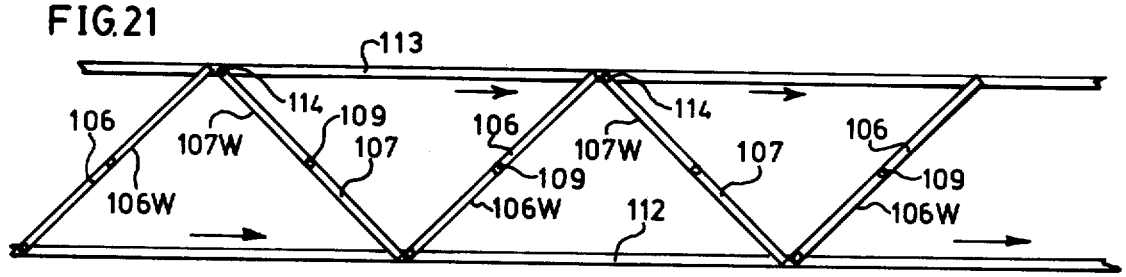
Figure 22:
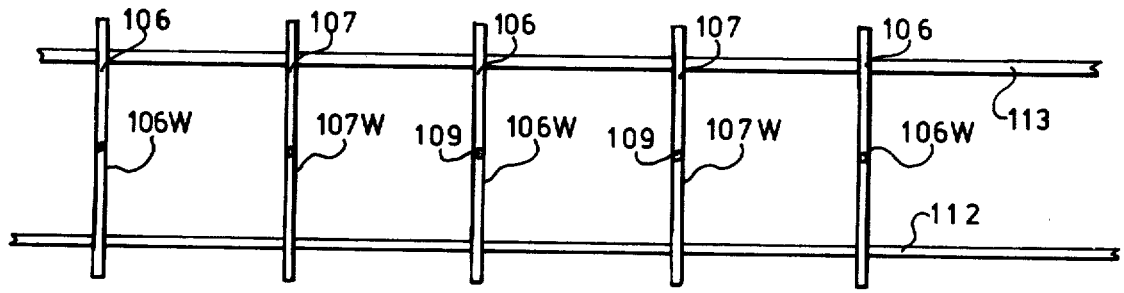

FIGS. 21 and 22 are schematic plan views showing another arrangement of light controlling elements.

The device shown in FIGS. 1–22 comprises a box or housing 11 open at the front and having top, bottom and side walls 12, 13, and 14, 16 respectively, (whose inner faces are painted non-reflective dull black), and having a rear wall arrangement 21 of controlled variable reflectivity. The light source 22 is situated at the front of the box and there is a reflector 23 to direct a substantial portion of its light toward the rear wall.

Preferably the light source is a standard high temperature lamp (having a color temperature of at least about 3200° Kelvin) such as a quartz halogen lamp of the type designated as "DYS" in the trade (color temperature about 3200° K.). A Sylvania DYS 600 W 120 V 6003 lamp has been found to be very suitable. That particular lamp has a tungsten filament 24 formed of thin wire tightly coiled into helical form so as to form a thicker structure, which thicker structure is in turn formed into a much looser helix (6 turns) having a diameter of about 5 mm and an axial length of about 10 mm. The filament is within the somewhat spheroidal portion 26 (which portion has a diameter of about 20 mm) of a quartz bulb 27 mounted in a ceramic base 28 having two lower projecting prongs (not shown) for fitting into a conventional ceramic electric receptacle 29 mounted at the front of the bottom wall 13 of the box 11. The receptacle 29 has standard resilient clips 32, 33 for firmly engaging, and frictionally retaining the ceramic base of the lamp.

The reflector 23 is conveniently made of a single piece of flat reflector metal sheet cut and bent into the illustrated shape. A very suitable material is high purity aluminum reflective sheeting having a specular face (directed towards the lamp) and a relatively dull opposite face, e.g. an Alzak aluminum sheet such as an Alzak sheet about 0.8 mm thick, Specular finish #1 consisting of #3003 alloy clad with alloy #1175 and chemically and electropolished and then clear anodized for protection of the reflective surface. The reflector has a center portion 36 and two reflective wings 37, 38. The center portion 36, which is conveniently rectangular, is dished centrally (into roughly the form of a surface of a segment of a sphere) at the area 39 which (when the reflector is mounted) comes closest to the bulb; this dished zone provides a reflective area less than 5 mm and preferably less than 3 mm from the outer surface of the quartz bulb. The two reflective wings are each disposed at an angle such that a major portion of the light from the lamp is directed at the rear of the box 11. In one preferred form, the center portion 36 and the reflective wings 37, 38 each measure about 2.5 cm × 5.5 cm and each wing is in a plane at an angle of about 67° to the plane of the center portion, the radius of the spherically dished portion 39 is about 1½ cm and the thickness of the airspace between the bulb 26 of the lamp and the dished reflective portion is in the range of about 1 to 2 mm. Thus the light travels through a path of minimum length before reaching the reflector which acts to magnify the filament image. The rear surface of the box thus receives light directly from the bare bulb, and additionally from the reflector, all combining to maximize the even distribution of light. This reflector, in addition to being efficient in its light gathering and distribution properties, also tends to increase the incoherence, or controlled scattering of the light rays, thus contributing to the diffused, or soft quality of the light. The illustrated reflector (whose wings 37, 38 are of such size and shape that the light passing directly from the filament is essentially limited to the area of rear wall arrangement 21, and to the top and bottom walls 12, 13) has been found to be very suitable.

For mounting the reflector 23, it has an offset extension 41 which is resiliently clamped in place in a housing 42 fixed to the bottom wall 13 of the box 11. This extension 41 fits through a slot 43 at the front of the top 42A of the housing 42 and is bifurcated to be supported on a pin 44 mounted in the front wall 46 of that housing, being held firmly in place by a spring-loaded clamping element 47 fixed to the end of that pin. The dimensions and structural relationships are such that the action of the clamping element 47 urges the lower part of extension 41 against the wall 46 and urges the reflecting portion (such as center portion 36) toward the bulb 27, so that the reflector is resiliently pressed against a portion (e.g. projection 49) of the lamp-holding resilient clip 32 which acts as a stop to prevent the reflector from touching the bulb and insures proper spacing of reflector and bulb. The spring-loaded clamping action insures that this proper spacing is maintained even when the reflector becomes very hot, and expands, owing to the heat of the lamp in use.

In the illustrated embodiment, the pin 44 is mounted for axial movement in a suitable bearing (such as grommet 51) in the front wall 46 of the lower housing 42 and the clamping force is provided by a helical spring 52 disposed around the pin and pressing against a knob 53 at the outer end of the pin. Removal and installation of the reflector (as when a lamp is being replaced) are simple. To install the reflector the knob 53 is pushed inward, against the force of the spring, to provide space for the extension 41 to fit over the pin without interference from the clamping element 47; then the knob is released to permit the spring to urge the clamping element against the two legs of the extension. To remove the reflector the knob is pushed inward to release the clamping action and the reflector is pulled out of the slot 43.

In the embodiment illustrated in FIGS. 1-18 there is a flat rectangular rear panel 56 having a rim 57 around it for fitting over the top, bottom and side walls of the box, and being secured thereto in any suitable manner, as by screws 58 (FIG. 16). This rear panel carries two sets of strips of different light reflectivity. One set has reflective flat (i.e. dull) white exposed outer surfaces and one set has non-reflective dull black exposed outer surfaces. The strips of one set are positioned between, and alternating with, the strips of the other set and the two sets are mounted for relative sliding movement so that the strips of one set progressively cover and obscure those of the other set and progressively vary the amount of light reflected forward by the device. Conveniently the strips are of thin sheet metal (e.g. of 0.4 mm thick hard aluminum alloy such as 2024 T6). The inside face 59 of the rear panel is preferably painted non-reflective dull black. The strips are preferably leaves supported at one end and free at the other.

In the embodiment illustrated in FIGS. 8-17 one set of leaves W (in this case the white leaves) is more or less fixed and the other set B is movable. The stationary leaves are mounted (as by screws or rivets 61 FIG. 3) at one end of each leaf, to a rigid mounting strip 62 (an angle bar) attached to the upper part of the rear panel 56 of the box 11. The other, black faced set of leaves B is similarly mounted on a similar rigid angle strip 63 whose rearwardly projecting portion 64 (FIGS. 12 and 13) fits, for sliding movement, in the space S (FIGS. 14 and 15) between the rear part of the bottom wall 13 and tracks 66, 67 fixed to the lower part of the rear panel 56. For controlled movement of this mounting strip 63 (and its attached leaves B) there is a rack-and-pinion arrangement, with the rack 68 being fixed to the central portion of the strip 63 and the pinion 69 being mounted in the rear panel 56 at about the level of the tracks. The shaft 71, on which the pinion is fixed, carries (fixed thereto) an operating knob 72 (FIG. 16) which is situated on the outside of the box for manual operation of the leaves.

The leaves of both sets are, in the preferred form, of substantially identical dimensions. Each leaf has, as shown in FIG. 8, a substantially flat light-receiving portion W1 or B1 most of which is disposed at a small angle (e.g. about 5°) to the vertical plane of the mounting strips. All the leaves (excepting, where desired, the end leaf, at the left in FIG. 2, of each set) are preferably bent longitudinally, at about the line along which a leaf is overlapped by its neighbor of the same set, to form a guideway 73 for the movement of the cooperating leaf of the other set, and also to provide increased rigidity. Preferably this bend is at an angle of about 75°.

In the illustrated embodiment the movable mounting strip 63 with the set of leaves B carried thereby is easily removable from the back panel, as by simply sliding it until its leaves completely cover the fixed leaves and then moving it forward to take it away from the guides or tracks 66, 67 and to separate its rack from the pinion. It is also very simple to put it back in place by simply positioning its leaves over the other set, sliding the movable strip and leaves in a direction to interfit the leaves, and adjusting the position of the strip so that its rearward edge fits into, and is slidably positioned in, the appropriate space defined by guides 66, this causes the rack 68 to operatively engage the pinion 69.

The relative movements of the two sets of leaves when the operating knob is turned are illustrated in FIGS. 8-10.

When only the leaves of the stationary set are exposed, as in FIG. 8, each movable leaf B is situated directly behind a neighboring (upstream) stationary leaf W. The stationary leaves thus constitute the effective stationary light-receiving rear surface of the device. At one end of that rear surface (to the left hand side of FIG. 2) a black movable leaf is exposed to the light, but it is in a position in which it does not receive the strong illumination directed by the reflector against the white leaves).

When (as in FIG. 9) the movable leaf has been moved so that half the exposed width of its other (downstream) neighboring stationary leaf W is obscured by half the width of the movable leaf, the other half of the movable leaf is still situated behind (and obscured by) its upstream neighboring stationary leaf.

When (as in FIG. 10) the movable leaf M has been moved so as to completely obscure its downstream stationary neighbor S, the resulting engagement of the bent guideway-forming portions W2, B2 of these two leaves may cause the movable leaves and their mounting strip to move slightly forward, in a direction towards the open front of the box; the dimensions of mounting strip, guides 66, 67, and rack and pinion are such as to permit this forward movement while maintaining the parts in operative engagement. (It will be understood of course that the long leaves W and B are flexible and that one may provide means for preventing or limiting this forward movement, in which case the free ends of the stationary leaves will become slightly bent backward resiliently owing to the engagement of the two sets of guideway forming portions, with the free ends of the movable leaves being correspondingly becoming slightly bent foward.)

In the illustrated embodiment there is a slight warp in the flexible leaves (of both sets) at a corner of each leaf at the end thereof which is fixed to its mounting strip, owing to the particular illustrated mode of attaching the leaves to the strips, as seen in FIG. 11.

To provide for easy access to the light control knob an arrangement as shown in FIG. 17 may be used, in which the single operating knob 72 on the rear of the device is replaced by a worm gear arrangement (indicated schematically as 76) on a long shaft 77 extending across the rear portion of the box 11. At each end of the shaft there is a knob 78 for manual rotation of the shaft to turn the pinion and thus vary the amount of reflected light. It will be also understood that the knob 72 may be of such type that a flexible operating cable (not shown) can be fitted thereto, to be operated by an assistant who may walk alongside (or behind) the camera without interfering with the camera operator.

When desired, the rear panel 56 may be removed and replaced with a similarly shaped rimmed rectangular panel having a highly reflective diffuse surface, so that the entire unit may be used away from the camera as a conventional, and frequently required, source of soft diffuse, localized light on the subject matter to be photographed.

The entire box or housing 11 may be mounted in a balanced manner in a yoke or bail 81 having a receptacle 82 to fit a conventional stud 83 (e.g. a ⅝" stud) of a standard light supporting device. This stud may, for instance, be part of a conventional arm 84 (FIG. 1) with articulated elbow joints secured to and projecting from the camera itself or the stud may be part of a conventional extendable type of tripod stand (not shown) regularly available in the field. The yoke or bail 81 acts as a gimbal apparatus for positioning the lamp, and has a tie-off thumb screw 86 on one side to frictionally maintain the device at the desired angle on the yoke.

Another aspect of the invention (illustrated in FIGS. 18–20) relates to the use of a rear panel 56' (having a rim 57') which supports pivoted overlapping leaves or slats 91, each having a non-reflective dull black face 91B and an opposite reflective dull white face 91W, with means for pivoting the slats to control the amount of light reflected out of the device. When the slats are in the position shown in FIGS. 18 and 20, with their white faces exposed, the amount of such reflected light is at a maximum. As the slats are rotated toward the position shown in FIG. 19 their black faces and part of the black face 56' B of the rear panel 56' will become exposed to the light from the lamp and the amount of light reflected out of the device will decrease progressively until it reaches a minimum when the slats are in the position shown in FIG. 19.

In the embodiment illustrated in FIGS. 18–20 the slats 91 are bent at 93 along one edge to provide an offset portion 94 to stiffen the slats and for attachment to lower and upper rotatable pivots 96, 97; and the faces 94B of those offset portions which become exposed to the light of the lamp are similarly painted black. One of the pivots 96 (designated 96') is fixed preferably co-axially as shown to an operating knob 99 situated outside the box and the slats are operatively joined together for simultaneous movement, e.g. by means of a connecting rod 101 carrying rotatable pivots 102 fixed to the slats adjacent these slat edges which are remote from the supporting pivots 96, 97. The two pivots 96, 97 for each slat are in axial alignment and all the pivots 96, 97 are journaled, respectively, in lower and upper pivot-supporting rods 103, 104 which are supported in fixed position (by brackets not shown) on the rear wall 56'B.

In the embodiment illustrated in FIGS. 21 and 22 there are two sets of slats 106 and 107, each having a diffusely reflective white face 106W or 107W. The opposite face of each slat may be white or black or gray (or otherwise colored). Each slat is attached to an upper central pivot 109 and a lower central pivot (not shown) aligned with the upper pivot. The pivots are supported on suitable mounting strips (not shown) attached to the rear panel.

In FIG. 21 the slats are shown in a highly reflecting position in which the edges of the slats abut, so that the white faces 106W, 107W of the slats substantially completely obscure the black inside face of the rear panel. The assembly of slats in this position thus forms a serrate diffuse reflector.

In FIG. 22 the slats are shown rotated to a position in which the light from the lamp is absorbed by the black inner face of the rear panel, and the slats are in planes perpendicular to that rear panel. It will be seen that set 106 of slats rotates 45° in one direction and set 107 rotates 45° in the opposite direction. This rotation is effected by the turning of a knob (not shown) operatively connected, in conventional manner, to two reciprocable bars 112 and 113. Bar 112 is operatively connected, by means of lost-motion connection (not shown) to the slats 106 of one set, while bar 113 is similarly connected, at 114. to the slats 107 of the other set.

It will be understood, of course, that the amount of light reflected progressively decreases as the slats are rotated from the position shown in FIG. 21 to that shown in FIG. 22.

The devices described above have been found to produce a desirable relatively confined beam of diffuse light of quite uniform intensity across the width of the beam. This has been shown, for instance, in tests in which the device shown in FIGS. 1–16 was set up facing the center of a white sheet, tautly stretched over an area of 5 feet by 9 feet, located 4 feet from the front of the device. Visual examination showed that there was an evenly lit roughly rectangular area measuring about 4 feet wide by 3 feet high, centered on a line projected from the center of the front opening of the device.

Around that rectangular area the light intensity was much lower. Instrumental measurements (in foot-candles, using a standard light meter, Spectra Professional) gave the readings shown in the tabulation, below, at the indicated positions in that rectangular strongly lit area at the settings of the movable leaves indicated in the tabulation. These indicate small differences in light intensity from the center to the edges of the rectangular area, but those differences are well within the tolerance of all commercially available motion picture film, whether color or black and white, so that for all practical purposes there were no differences at all from center to edges. In these tests, the device had slots whose black and white coatings has been applied by hand with paints readily avilable in retail outlets. Coatings which are much more efficient (from the point of view of diffuse light reflectance, for white, and light absorption, for black) are well known in the art; with such coatings it is to be expected that the light output at the high setting will be some 15 to 20 percent greater or more, and the light output at the lowest setting will be corresponding lower. It should be noted that owing to the linear non-rotary movement of the movable light-controlling elements, the device shown in FIGS. 2-17 maintains a linear relationship between the total white area and the degree of rotation of the knob 72 and that the data in the tabulation indicate that this linear relationship also applies substantially to the actual light output; this makes for better and easier manual control by the operator.

front opening of the device. Also, it may at times be desirable to restrict the extent of the area illuminated by the device; for that purpose forward extensions of the sides or of the top or bottom walls (or extensions) of all such walls, e.g. a "snoot" or "barn doors") may be added.

Figure 1:
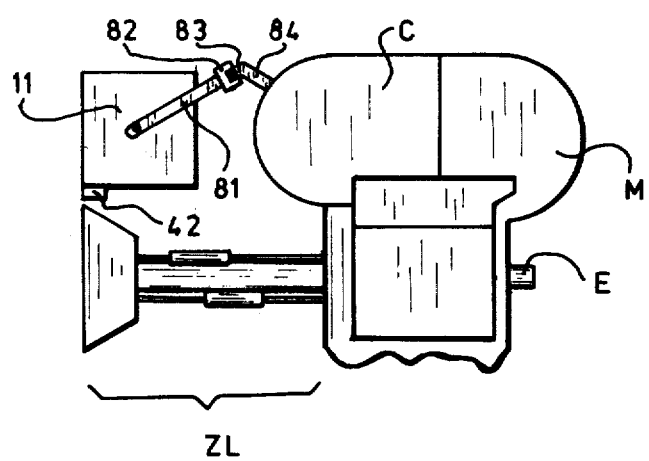
FIG. 1 is a schematic side view of the novel O.B. light mounted on a camera.

In FIG. 1 the device is shown mounted on a professional motion picture camera (such as a Mitchell BNCR) having a zoom lens ZL, or an eyepiece E, a film magazine M having a conventional sound-deadening cover (or "blimp") C from which there projects an articulated arm 84 having a stud 83. While FIG. 1 shows the device secured to the camera with the lower switch housing 42 situated between the box 11 and the camera, one may use an arrangement in which that switch housing is in another position so that the front opening of box 11 can be even closer to the camera lens. For instance, the illustrated device may be used, without change, in upside-down position (with the switch housing at the top and the lamp 22 depending downward therefrom). Preferably (for longer lamp life) the device is used in a position in which the axis of the large helix of the lamp filament is horizontal. Of course, other arrangements for securing the device to a camera (or other supporting structure) may be employed; for instance the yoke or bail can be replaced by a clamp or knuckle arrangement of known construction.

The stainless steel clips 32 and 33 (FIG. 6) are parts of a standard ceramic lampholder 29 manufactured by the

| APPROXIMATE PROPORTION OF WHITE LEAVES UN-OBSCURED | MEASURED FOOT CANDLES | | | | | | |
|---|---|---|---|---|---|---|---|
| | CENTER | UPPER LEFT CORNER | UPPER RIGHT CORNER | LOWER RIGHT CORNER | LOWER LEFT CORNER | MIDDLE OF LEFT EDGE | MIDDLE OF RIGHT EDGE |
| ALL | 108 | 100 | 100 | 100 | 100 | 101 | 101 |
| ⅔ | 72 | 70 | 70 | 70 | 70 | 70 | 70 |
| ½ | 53 | 50 | 50 | 50 | 50 | 50 | 50 |
| ⅓ | 32 | 31 | 31 | 31 | 31 | 31 | 31 |
| 1/6 | 16 | 15 | 15 | 15 | 15 | 15 | 15 |
| NONE | 7 | 7 | 7 | 7 | 7 | 7 | 7 |

It will be understood, of course, that the coatings of the light receiving faces in the illustrated embodiments may be reversed. For instance, the stationary leaves W may have black light-receiving faces, and the movable leaves B may have white light receiving faces.

In the devices described above the dimensions are as follows: the front opening of the box measures about 15×23 cm. the slats are situated about 14 cm from the front of the box and are about 13¼ cm in height, with the width of the main portion of each slat being about 2¼ cm. Preferably the device is rectangular (e.g. such as square or having a ratio of long side length to short side length of about 1¼ to 1 shown, 2:1 maximum preferable).

In use, relatively high temperatures well over 600° F. may be encountered in the device. For instance a temperature of almost 750° F. has been measured at a point just forward of the rear panel. To help remove the heat there are preferably ventilating louvres such as baffled horizontal slits formed (not shown) in the rear panel. The walls of the box, panel, and slats or leaves are preferably made of aluminum and the black and white diffusive coatings are of course of heat resistant material.

For certain effects it is, at times, desirable to increase the diffuse nature of the light; to this end the device may have clips 111 (FIG. 2) to hold diffusing filters (e.g. fiberglass sheets, wire mesh, sil, scrim, etc.) across the General Electric Co. for use with DYS-DYV bulbs. The molded ceramic base 28 has projections designed to the edges of openings in the stainless steel spring clips. These clips firmly grip the bulb when it is placed in the socket, and prevent it from falling out when the lamp is operated in other than the upright position (as may be required in many situations). As mentioned above, the clip 32 also acts as a stop (whose position is fixed by to engagement with base 28) to insure proper spacing of reflector and bulb; the construction is such that in the absence of a stop the reflector would, when clamped, be closer to (or touching) the bulb. That is, the reflector is pressed resiliently against the clip 32. It will be understood, of course, that other stop arrangements may be used; for instance the reflector may be shaped so that the ceramic base 28 (or receptacle 29) may serve as the stop.

The lamp 22 (FIGS. 2,3,4,6), DYS-DYV is manufactured in substantially identical configurations to fit the above described lampholder, by Sylvania, General Electric, and Phillips (in Europe). It is a high intensity lamp standardly availabe in voltages of 30 (for battery operation), 120, and 240, and in many wattages ranging from 250 to 900.

Figure 23:
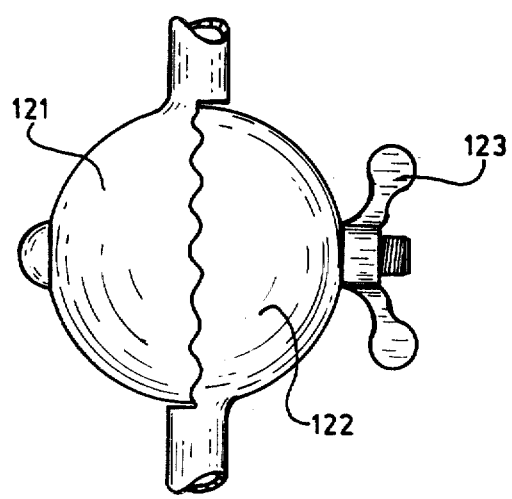
Figure 2:
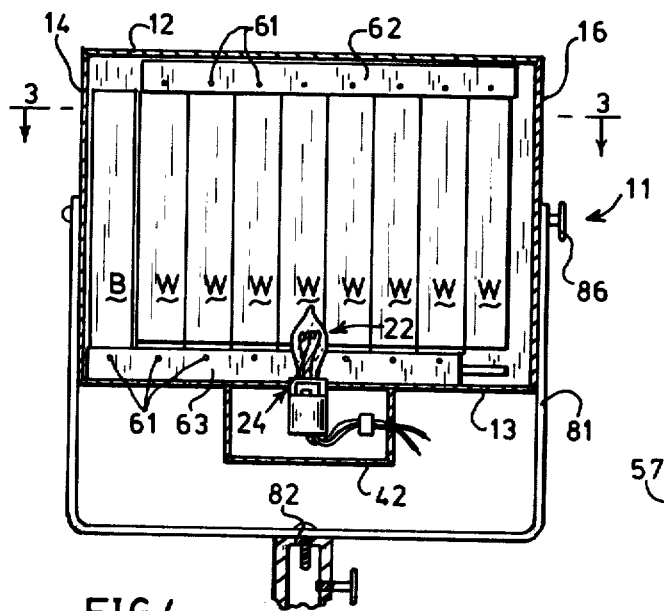
FIG. 2 is a front view of the device without the rearward facing reflector and without the front wall of a reflector-holding housing.
Figure 3:
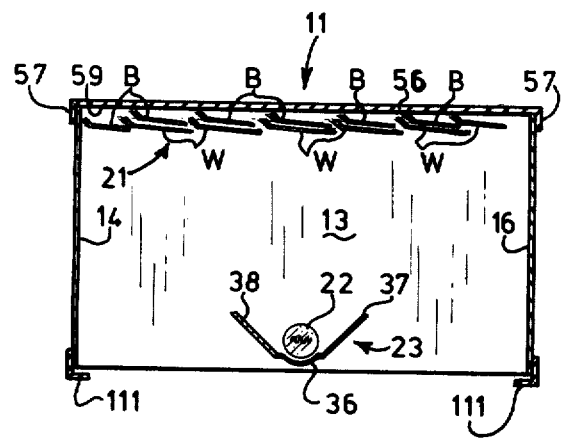
FIG. 3 is a plan view of a cross-section of the interior of the device showing the relationships of light source, reflector and light receiving surfaces, but with portions omitted for simplicity.
Figure 4:
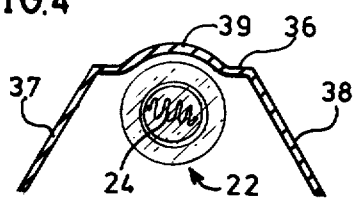
FIG. 4 is a plan view in cross sectional showing the relationship of reflector and lamp.
Figure 5:
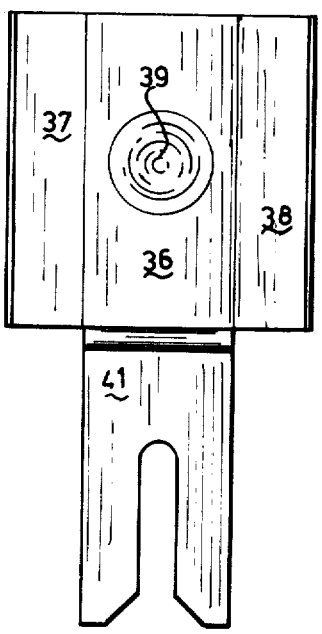
FIG. 5 is a view of the reflective (lamp-facing) side of the reflector, in elevation.
Figure 6:
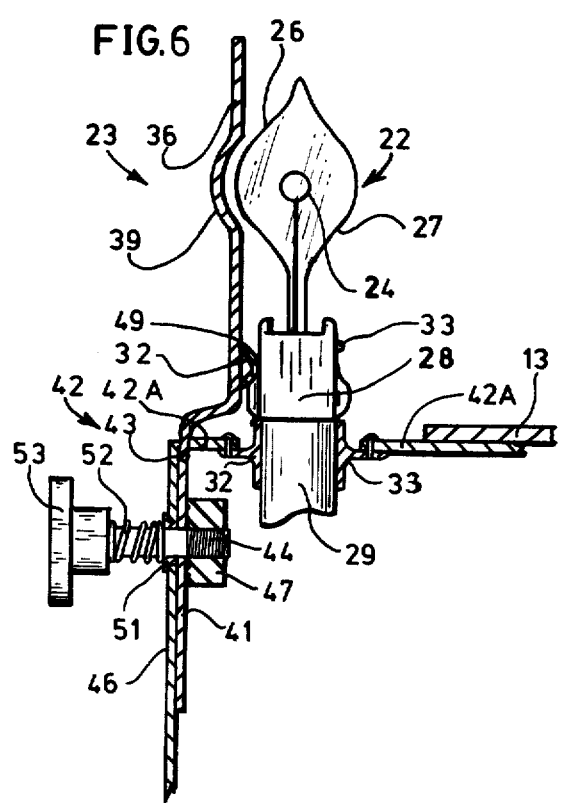
FIG. 6 is a cross-sectional view of portions of the lamp, the reflector and the mountings for bulb and reflector.
Figure 7:
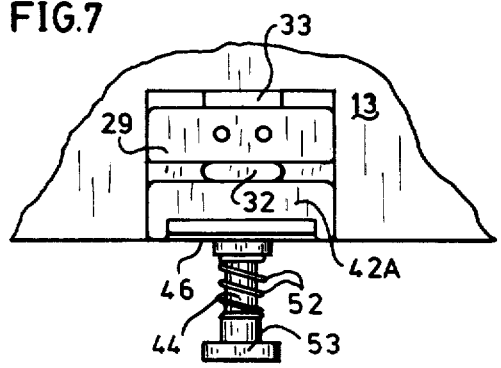
FIG. 7 is a plan view of portions of the mountings for bulb and reflector.

In FIG. 23 there is illustrated a knuckle arrangement to be used instead of (or in addition to) the previously illustrated yoke or bail 81. The knuckle comprises two clam shell-like halves; one half 121 extends to and terminates in a flange to be fastened to the bottom of the box 11 while the other half 122 extends to a receptacle adapted to receive a stud (such as stud 83). The two halves may have mating serrated surfaces adapted to be pressed together by a suitable arrangement such as thumb screw arrangement 123, to maintain frictionally any desired tip or tilt attitude of the device.

It is understood that the foregoing detailed description is given merely by way of illustration and that variations may be made therein without departing from the spirit of the invention.

I claim:

1. An illuminating device comprising a housing; a high temperature lamp, suitable for color photography, mounted at the forward part of the housing; a reflector, forward of the lamp, to reflect its light toward the back of the housing; a plurality of sets of strips of different light reflectivity at the rear of the housing and situated to receive the light from the reflector; one set of said strips having a reflective diffusive white exposed outer surfaces for reflecting light towards said forward part of the housing and the other set having a non-reflective dull black exposed outer surface, the leaves of one set being positioned between, and alternating with, the strips of the other set; the sets being mounted for relative sliding movement so that the strips of one set progressively cover and obscure those of the other set and thus progressively vary the amount of light reflected forward by the device; and means for effecting said sliding movement, said device being constructed to illuminate by the light emanating from the forward part of the housing.

2. A device as in claim 1 including means for attaching said device to an operating movable motion picture camera for movement with said camera.

3. A device as in claim 1 mounted on an operating movable motion picture camera for movement with said camera.

4. An illuminating device comprising a housing having a forward opening and a back portion of variable reflectivity; a high temperature lamp suitable for color photography mounted at the forward part of the housing, said lamp having a filament in a bulb whose diameter is less than 3 cm; a reflector forward of the lamp, to reflect its light toward said back portion, said reflector having a first portion situated less than 5 mm from said bulb and comprising highly reflective sheet aluminum; means for supporting said reflector comprising a spring-loaded clamp engaging a portion of said reflector at a point remote from said first portion and fixed means for engaging said reflector between said remote point and said first point; and means for varying the reflectivity of said back portion.

5. A device as in claim 4 mounted on an operating movable motion picture camera for movement with said camera.

6. An illuminating device comprising a housing having a rectangular foward opening and substantially flat top, bottom and side walls, the inside faces of said walls being dull, non-reflective black; a high temperature lamp, suitable for color photography, mounted at the forward part of the housing; a reflector, forward of the lamp, to reflect its light toward the back of the housing; the rear of said housing having a plurality of strips having diffusive white reflective faces situated to receive substantially all the light reflected rearwardly by said reflector and means for progressively obscuring said white faces from said light.

7. A device as in claim 6 mounted on an operating movable motion picture camera for movement with said camera.

8. A device as in claim 6 in which said strips are flat slats pivotally mounted for rotation from said light receiving position to a position in which their white faces are substantially parallel to the front-to-rear axis of the housing or are turned away from the light from said lamp.

9. A device as in claim 6 in which said strips comprise a substantially fixed set of leaves and a movable set of leaves mounted for substantially linear movement progressively from positions obscured from the light of said lamp by the leaves of said fixed set to positions obscuring the leaves of said fixed set.

10. A device as in claim 9 said lamp being mounted centrally at the forward part of the housing, said lamp having a filament in a bulb whose diameter is less than 3 cm, said reflector having a first portion situated less than 5 mm from said bulb and comprising highly reflective sheet aluminum; said device including means for supporting said reflector comprising a spring-loaded clamp engaging a portion of said reflector at a point remote from said first portion and fixed means for engaging said reflector between said remote point and said first point.

11. A device as in claim 8, the construction and arrangement being such that there are a plurality of sets of said slats mounted so that when the slats are in a position giving high light reflection the slats of one set are at an angle to the slats of a second set, and said obscuring means comprises means for rotating the slats of said one set in one direction for rotating the slats of said second set in the opposite direction.

12. A device as in claim 11 wherein the slats of one set are at about 45 degrees to the slats of the second set when the slats are in said high reflection position and the slats of said two sets are substantially parallel to each other, and to said axis, when the slats are in a position giving low light reflection.

13. A device as in claim 4 in which said reflector has an end adjacent to said remote point and an opposite end adjacent to said first portion, said opposite end being free, the construction of said reflector being such that when clamped its first portion tends to approach said bulb and the extent of such approach is limited by said stop means, said reflector being resilient, so that when clamped at said remote point the reflector presses resiliently against said stop.

14. An illuminating device comprising a housing having a forward opening and back portion of variable reflectivity; a high temperature lamp suitable for color photography mounted at the forward part of the housing, said lamp having a filament in a bulb whose diameter is less than 3 cm; a reflector forward of the lamp, to reflect its light toward said back portion, said reflector having a first portion situated less than 5 mm from said bulb and comprising highly reflective sheet aluminum dished at said first portion to conform to the adjacent part of said bulb, and means for varying the reflectivity of said back portion.

15. A device as in claim 14 in which said reflector has a central reflective portion in which said first portion is situated, and substantially flat reflective wings extending substantially symmetrically at an angle to said first portion in directions to receive the light from said lamp and reflect it toward said back.

16. A device as in claim 15 in which said central reflective portion and said wings are of specular aluminum sheet.

17. A device as in claim 16 in which said angle is about 60 to 75 degrees, the lengths of said wings are insufficient to substantially block the light reflected forwardly from said back portion, said device comprising a housing having a rectangular forward opening, and substantially flat top, bottom, and side walls, the inside faces of said walls being dull, non-reflective black, said rectangular opening having an area of about 200 to 600 cm/sq., and the distance from said forward opening to said back portion of variable reflectivity being about 10 to 20 cm.

18. A device as in claim 17 in which said area is about 300 to 400 cm/sq., said distance is about 10 to 16 cm. The rating of said lamp is about 600 watts, and its color temperature is about 3200 degrees Kelvin, the rear of said housing having a plurality of strips having diffusive white reflective faces situated to receive substantially all the light reflected rearwardly by said reflector and means for progressively obscuring said white faces from said light.

19. A device as in claim 13 in which said stop means comprises a resilient clip frictionally engaging the base of said lamp.

* * * * *